United States Patent [19]

Yamashita et al.

[11] Patent Number: 4,878,137
[45] Date of Patent: Oct. 31, 1989

[54] DISK FILE DEVICE

[75] Inventors: Tohru Yamashita; Takaharu Takematsu, both of Hyogo, Japan

[73] Assignee: Mitsubishi Denki Kabushiki Kaisha, Tokyo, Japan

[21] Appl. No.: 151,665

[22] Filed: Feb. 2, 1988

[30] Foreign Application Priority Data

Feb. 2, 1987 [JP] Japan .................................. 62-20440
Apr. 3, 1987 [JP] Japan .................................. 62-81068

[51] Int. Cl.4 ............................................. G11B 17/22
[52] U.S. Cl. ................. 360/98.05; 360/98.06; 369/36
[58] Field of Search ............... 360/92, 133, 98.05, 360/98.06, 98.04, 132; 369/34, 38, 39, 36

[56] References Cited

U.S. PATENT DOCUMENTS

| 4,347,537 | 8/1982 | Schoettle et al. | 360/132 |
| 4,573,088 | 2/1986 | Kommoss | 360/71 |
| 4,608,679 | 8/1986 | Rudy et al. | 369/36 |
| 4,622,610 | 11/1986 | Makigawa | 360/92 |

FOREIGN PATENT DOCUMENTS

| 62-124662 | 6/1987 | Japan | 360/133 |
| 62-124663 | 6/1987 | Japan | 360/133 |
| 62-124669 | 6/1987 | Japan | 360/133 |
| 62-134852 | 6/1987 | Japan | 360/92 |

Primary Examiner—John H. Wolff
Assistant Examiner—Matthew J. Bussan
Attorney, Agent, or Firm—Sughrue, Mion, Zinn, Macpeak & Seas

[57] ABSTRACT

A disk file device includes a stocker for accommodating a plurality of cartridges each holding a disk. A cartridge displacing mechanism with a cartridge rceiving container passes a cartridge through an opening formed in the casing. A carrier moves a cartridge between the cartridge displacing mechanism and the stocker and between the stocker and a disk. The opening formed in the casing is on the side of the stocker and the cartridge displacing mechanism has an electric motor for turning the cartridge receiving container through 180° when a cartridge is passed through the opening so that the carrier and the cartridge receiving container are prevented from colliding.

17 Claims, 7 Drawing Sheets

FIG. 10

DISK FILE DEVICE

BACKGROUND OF THE INVENTION

The present invention relates to a disk file device in which a plurality of cartridges each containing a data medium such as a disk are placed on a plurality of cartridge receiving shelves and the cartridges thus placed are selectively supplied to a disk recording and reproducing device.

Figure 1:
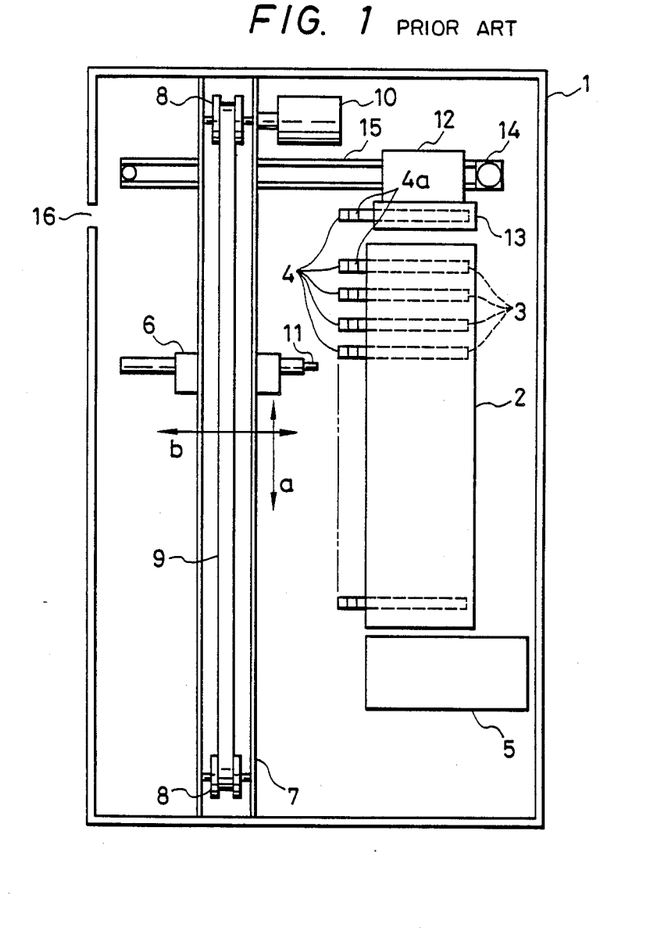
FIG. 1 is a vertical sectional view showing a conventional disk file device.

One example of a conventional disk file device of this type is as shown in FIG. 1 and in Japanese Utility Model Application (OPI) No. 136367/1986 (the term "OPI" as used herein means an "unexamined published application").

As shown in FIG. 1, a plurality of horizontal cartridge receiving shelves 3 are arranged vertically at equal intervals in a stocker 2 which is extended vertically in a casing 1. A plurality of cartridges 4 containing a data medium such as a disk are placed on the shelves 3, respectively. A disk recording and reproducing device 5 is provided below the stocker 2. A frame 7 is held vertically in the casing 1, and a pair of pulleys 8 are rotatably supported by the frame 7 at the upper and lower portions. An endless belt 9 is laid over the pulleys 8 and coupled to a carrier 6 adapted to select one of the cartridges 4 and to move it. The endless belt 9 is driven vertically (as indicated by the arrow a) by a carrier driving electric motor 10. The carrier 6 has a finger unit with fingers 11 which is movable horizontally (as indicated by the arrow b). The finger 11 is engaged with a groove 4a formed in one end portion of a cartridge 4 to hold that cartridge.

A cartridge displacing mechanism 12 having a container 13 is provided above the stocker 2. The mechanism 12 is driven by a cartridge displacing mechanism driving electric motor 14 to move along a horizontal guide rail 15. A cartridge supplying and receiving opening 16 is formed in the wall of the casing 1 on the side of the casing which is opposite to the side where the stocker is provided, in such a manner that the opening 16 meets with the container 13. Through the opening 16, the cartridge is supplied out of the casing 1, or it is received into the casing 1.

The operation of the conventional disk file device will now be described. A cartridge 4 is filed in the device as follows: First, the cartridge displacing mechanism 12 and the driving motor 14 are operated to move the container 13 near the opening 16. Then, the cartridge is manually inserted into the casing 1 through the opening 16 with the cartridge's groove 4a held toward the operator so that the cartridge is inserted into the container 13. Under this condition, the cartridge displacing mechanism 12 and the motor 14 are operated again to return the container 13 to its original position.

Thereafter, the carrier driving electric motor 10 is operated to move the carrier 6 up until its fingers 11 reach the level of the container 13. The finger unit is moved towards the container 13 with the fingers 11 opened. Thereafter, the fingers are closed, and the end portion of the fingers thus closed is engaged with the groove 4a of the cartridge 4. The finger unit is returned to the original position so that the cartridge 4 is held by the carrier 6. Under this condition, the carrier 6 is moved to the level of a selected one of the shelves 3, and the fingers 11 are moved towards the selected shelf 3 so that the cartridge is placed on the shelf.

The cartridge 4 can be moved to or from the disk recording and reproducing device 5 in the same manner as that described above with respect to the carrier 6.

The above-described operations are carried out in the reverse order to move the cartridge 4 from the shelf 3 through the opening 16 to the outside of the casing.

The conventional disk file device thus constructed suffers from the following disadvantages: The cartridge displacing mechanism is relatively intricate. The cartridge container 13 goes across the movement area of carrier 6 and therefore the carrier and the container may collide with each other, and at worst they may be damaged.

SUMMARY OF THE INVENTION

Accordingly, an object of the present invention is to eliminate the above-described drawbacks accompanying a conventional disk file device.

More specifically, an object of the present invention is to provide a disk file device which is simple in construction and which is designed so that the container for receiving a disk will not go across the movement area of the carrier.

The foregoing object and other objects of the present invention have been achieved by the provision of a disk file device which, according to one aspect of the invention, comprises: a stocker for accommodating a plurality of cartridges which hold a disk; a disk recording and reproducing device for writing data on said disk and reading data therefrom; a carrier for selectively supplying the cartridges from the stocker to the disk recording and reproducing device and for selectively supplying the cartridges from the disk recording and reproducing device to the stocker at a time; a casing having a cartridge supplying and receiving opening which is formed in the upper portion on the side of the stocker; and a cartridge displacing mechanism provided above the stocker, the cartridge displacing mechanism including a container driving electric motor, a cartridge receiving container which is turned through 180° in a horizontal plane by the electric motor when required, and means for receiving the cartridge through the opening and supplying it to the carrier.

The nature, principle and utility of the present invention will become more apparent from the following detailed description when read in conjunction with the accompanying drawings.

DETAILED DESCRIPTION OF THE PREFERRED EMBODIMENTS

Preferred embodiments of the present invention will be described with reference to the accompanying drawings.

Figure 2:
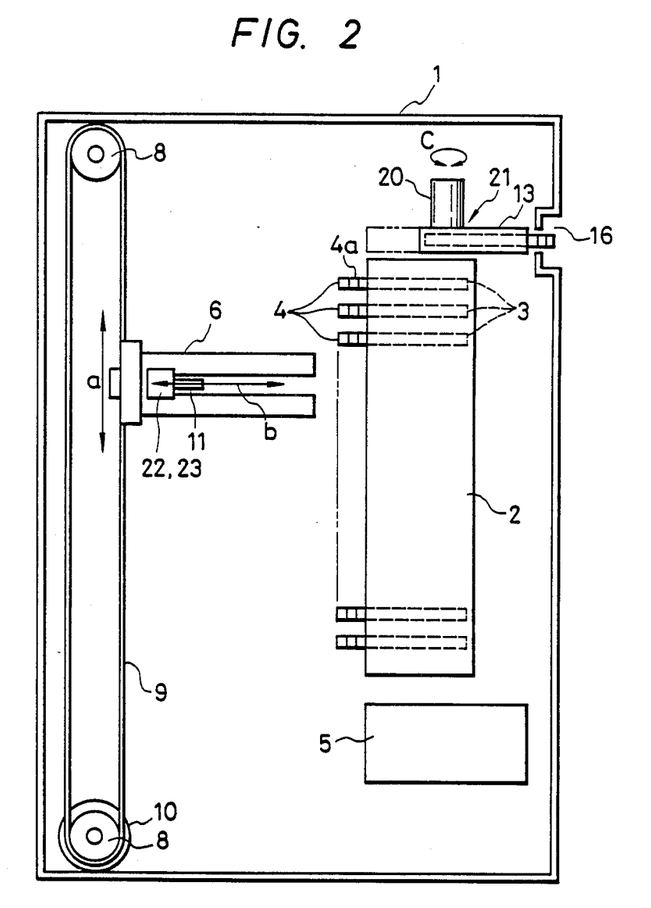
FIG. 2 is a vertical sectional view showing a first embodiment of a disk file device according to the present invention.
Figure 3:
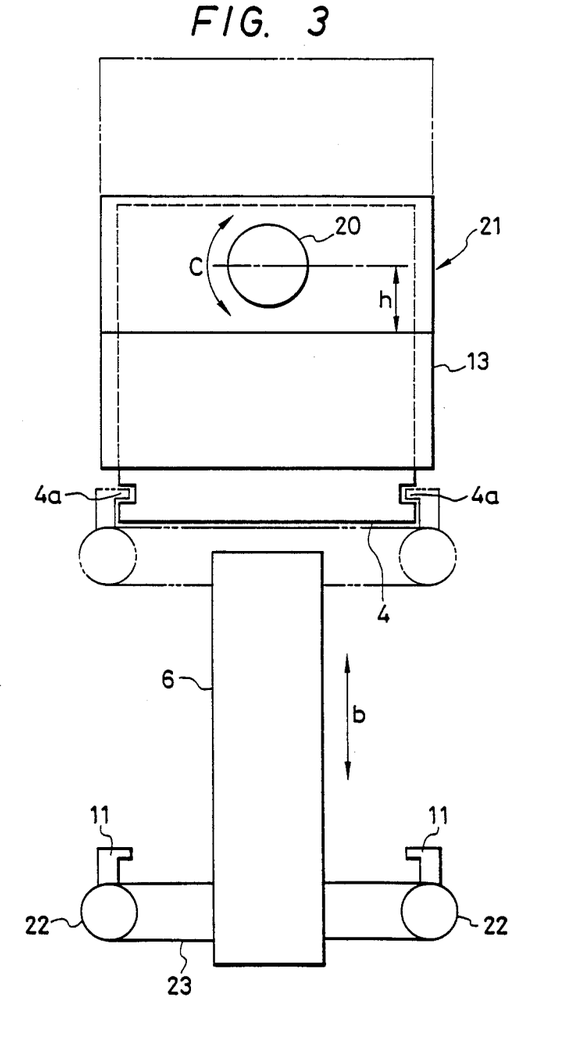
FIG. 3 is an enlarged plan view showing a portion of the disk file device shown in FIG. 2.

A first example of a disk file device according to the present invention is as shown in FIGS. 2 and 3, in which those components which have been previously described with reference to FIG. 1 are therefore designated by the same reference numerals.

In the disk file device, as shown in FIG. 2, a cartridge supplying and receiving opening 16 is formed in the upper portion of the wall of a casing 1 which is located on the side of a stocker 2, in such a manner that the opening 16 is set back inwardly from the casing 1.

A container 13 for receiving a cartridge 4 is coupled to a container driving electric motor 20 so that it is turned horizontally through 180° as indicated by the arrow c. The motor 20, as shown in FIG. 3, is spaced backwardly from the center of the container. A carrier 6 for carrying a cartridge has fingers 11 and finger driving elements 22 which are supported by a finger supporting member 23.

The remaining components are substantially equal in construction and arrangement to those in FIG. 1.

The operation of the disk file device thus constructed will be described.

Similarly as in the conventional device, the cartridge 4 inserted into the opening 16 with the groove 4a faced towards the operator is received by the container 13. The container 13 is turned through 180° in a horizontal plane by the motor 20. That is, as shown in FIG. 3, the position indicated by the solid line from the position indicated by the chain line to bring the cartridge 4 over to the side of the carrier 6. Under this condition, the fingers 11 are moved to the position indicated by the chain line. Thereafter, the device is operated in the same manner as the conventional one, to place the cartridge 4 on the selected shelf 3.

The above-described operations are performed in the reverse order to move the cartridge 4 out of the casing 1. As is apparent from the above description, the cartridge supplying and receiving opening 16 is formed in an inwardly recessed part of the wall. Therefore, when the container 13 is turned to the side of the opening 16, the end portion of the cartridge 4 protrudes through the opening in the recessed part of the wall as shown in FIG. 2, so that it can be readily taken out of the casing 1 with the operator's fingers.

As is apparent from the above description, the container 13 will never cross the carrier's movement area.

In the above-described device, the container 13 is coupled directly to the motor 20. However, it goes without saying that a power transmission mechanism such as a belt or gears may be provided between the container 13 and the motor 20.

FIGS. 4 through 10 shows a second embodiment of the disk file device according to the present invention.

Figure 4:
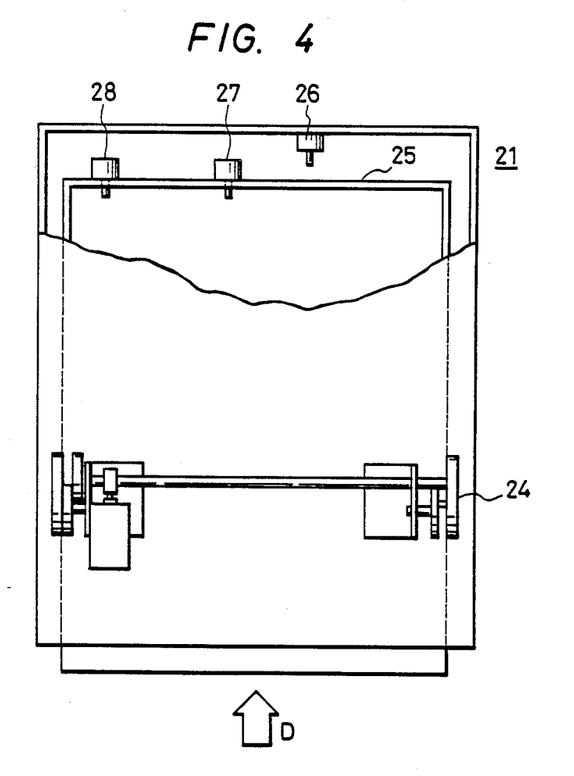
FIG. 4 is a plan view, with parts cut away, showing essential components of a second embodiment of the disk file device according to the present invention.

The disk file device has a cartridge displacing mechanism 21 with a loading mechanism section 24. The mechanism 21 is provided with a tray 25 into which the cartridge 4 is inserted, a loading completion limit switch 26 for detecting the completion of loading of the tray 25, and an insertion completion limit switch 27 for detecting the completion of insertion of the cartridge 4 into the tray 25, and a surface identifying limit switch 28 for identifying the surface of the cartridge 4. The cartridge displacing mechanism 21 operates to place the cartridge 4 on a selected one of the shelves 3. A carrier 6 operates to convey the cartridge 4 between the shelves 3 and the disk recording and reproducing device 5. In the figures, the arrow D shows the direction of insertion of the cartridge 4.

Figure 9:
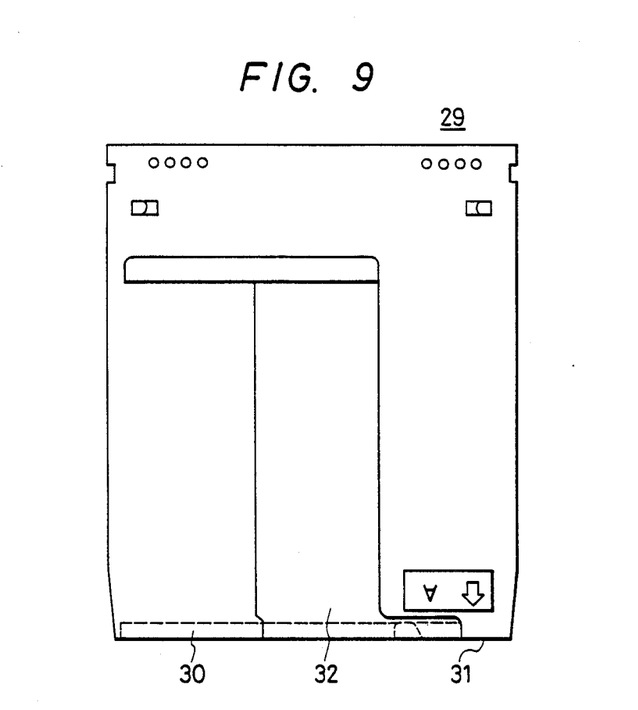
FIGS. 9 and 10 are a plan view and a sectional view showing a cartridge used in the device of the present invention.
Figure 10:
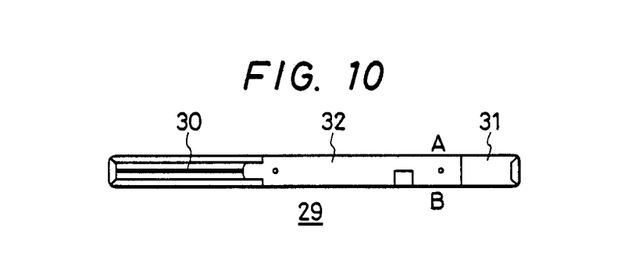

The cartridge 4, as shown in FIGS. 9 and 10, has a shutter guide groove 30, a surface identifying end face 31 and a shutter 32.

The operation of the device thus constructed will be described.

Upon insertion of the cartridge 4 shown in FIGS. 9 and 10 into the cartridge displacing mechanism 21, the insertion completion limit switch 27 is turned on in the tray 25. Thus, the cartridge 4 has been loaded. At the same time, the surface identifying limit switch 28 is operated ON or OFF by the surface identifying end face 31 of the cartridge 4.

Figure 7:
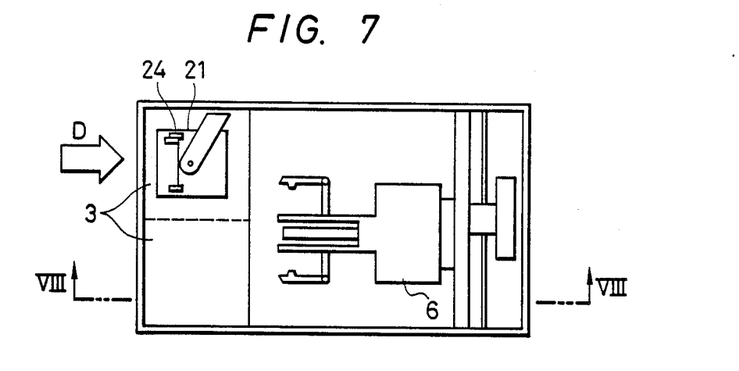
FIG. 7 is a horizontal sectional view showing the second embodiment of the disk file device according to the present invention.
Figure 8:
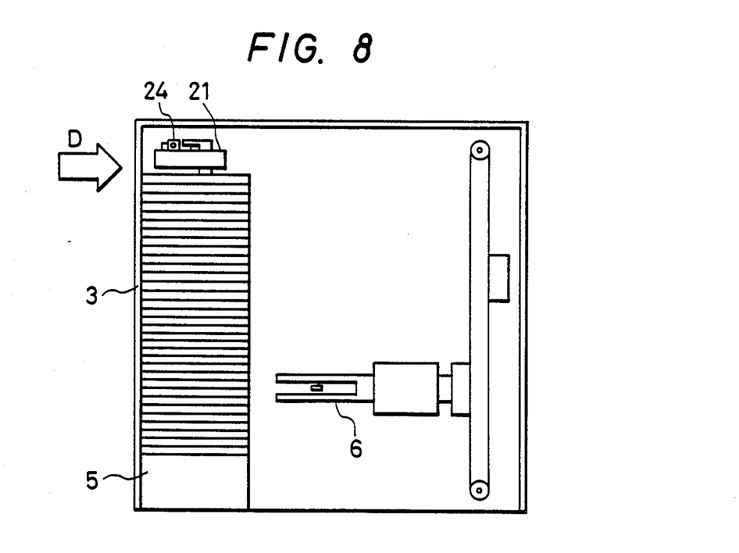
FIG. 8 is a sectional view taken along line VIII-VIII in FIG. 7.

When the cartridge 4 is inserted with its "A" surface upward, the surface identifying limit switch 28 is turned on by the surface identifying end face 31, to output a detection signal. The detection signal is applied to a controller comprising a microcomputer (not shown), so that it is determined that the "A" surface of the cartridge is held upward. Thereafter, the cartridge 4 is placed on the selected shelf 3 by means of the carrier 6, which is designed as shown in FIGS. 7 and 8, in such a manner that the "A" surface is held upward. If the cartridge 4 is inserted with the "B" surface upward, then it is loaded once, but the surface identifying limit switch 28 is turned off by the shutter guide groove 30, to apply a detection signal to the controller, so that it is determined that the cartridge 4 has been inserted with the "B" surface upward. As a result, the controller outputs a cartridge unloading instruction. Thus, the device is held in standby state until the cartridge is inserted again.

As was described above, in the cartridge displacing mechanism, the surface of the cartridge which is held upward is detected. Therefore, a plurality of cartridges 4 can be placed on a plurality of shelves 3, respectively, in such a manner that they are all facing in the same direction.

Figure 5:
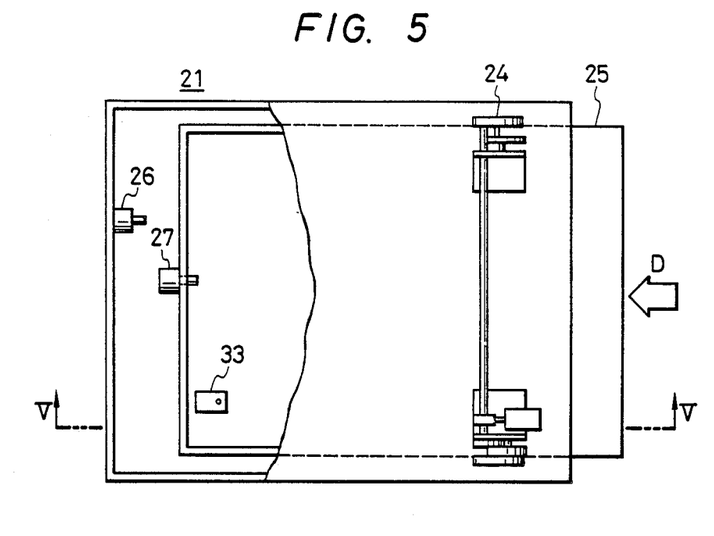
FIG. 5 is a plan view, with parts cut away, showing another example of a surface identifying limit switch illustrated in FIG. 4.
Figure 6:
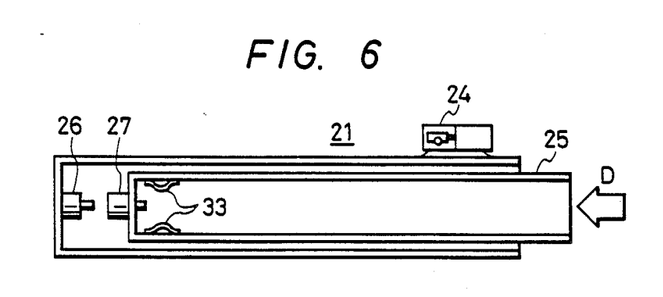
FIG. 6 is a sectional view taken along line VI-VI in FIG. 5.

The surface identifying limit switch may be a switch having a pair of metal leaf springs 33 as its electrodes which are provided in the tray 25 in such a manner that, when the cartridge is inserted into the tray with a certain one of its surfaces held upward, the shutter 32 is brought into contact with the leaf springs 33 of the switch. This allows current to flow therein, thereby causing the controller to determine which of the two surfaces is held upward.

As was described above, in the first embodiment of the invention, the cartridge supplying and receiving opening is formed in the upper portion of the wall located on the side of the stocker, and the cartridge receiving container is provided in such a manner such that it is rotatable through 180° in a horizontal plane. Therefore, the cartridge displacing mechanism is considerably simple in construction, and the disk file device of the present invention is free from the difficulty that the carrier and the container may collide with each other, or at worst, that they may be damaged.

In the second embodiment of the present invention, the surface identifying limit switch is provided on the tray of the cartridge displacing mechanism, and the output signal of the switch is processed by the controller using a microcomputer to identify what is the upper surface of the cartridge inserted in the mechanism. Therefore, the period of time required for placing the cartridge on the selected shelf after the surface identification can be reduced. In addition, a plurality of cartridges can be placed on the shelves in such a manner that they are all facing in the same direction. Thus, control of the cartridges can be achieved with ease.

What is claimed is:

1. A disk file device comprising:
   a stocker for accommodating a plurality of cartridges each holding a disk;
   a disk recording and reproducing device for writing data on said disk and reading data therefrom;
   a carrier for selectively supplying said cartridges from said stocker to said disk recording and reproducing device and for selectively supplying said cartridges from said disk recording and reproducing device to said stocker;
   a casing containing said stocker, said disk recording and reproducing device and said carrier with said carrier being located between said stocker and a first portion of said casing, said casing having a cartridge supplying and receiving opening which is formed in a portion of said casing other than said first portion; and
   a cartridge displacing mechanism including a cartridge receiving container for receiving a cartridge through said opening, and means for rotating said container so as to supply said received cartridge to said carrier.

2. A device as claimed in claim 1, wherein said rotating means comprises a container driving electric motor spaced closer to an end of said cartridge receiving container which is not closest to said opening than to an end which is closest to said opening.

3. A device as claimed in claim 1, in which said casing has a part which is recessed inwardly in such a manner as to be substantially U-shaped in vertical section, and said cartridge supplying and receiving opening is formed in said recessed part of said casing.

4. A device as claimed in claim 1, wherein said cartridge displacing mechanism further includes a surface identifying limit switch and said disk file device further comprises a controller including a microcomputer for identifying, in response to a detection signal output by said limit switch, the surfaces of said cartridge inserted into said cartridge displacing mechanism.

5. A device as claimed in claim 4, wherein said rotating means comprises a container driving electric motor spaced closer to an end of said cartridge receiving container which is not closest to said opening than to an end which is closest to said opening.

6. A device as claimed in claim 4, in which said casing has a part which is recessed inwardly in such a manner as to be substantially U-shaped in vertical section, and said cartridge supplying and receiving opening is formed in said recessed part of said casing.

7. A device as claimed in claim 4, in which said surface identifying limit switch is a switch whose electrodes are a pair of metal leaf springs.

8. A device as claimed in claim 1, wherein said cartridge receiving container receives a cartridge from said carrier, is rotated by said rotating means, and supplies said cartridge received from said carrier to said opening.

9. A device as claimed in claim 1, wherein said cartridge displacing mechanism and said opening are provided in said device above said stocker.

10. A device as claimed in claim 1, wherein said input cartridge, after having been rotated by said rotating means, is in the identical horizontal position as the cartridges in said stocker.

11. A device as claimed in claim 1, wherein said rotating means rotates said received cartridge through 180° in a horizontal plane.

12. A device as claimed in claim 1, wherein said cartridge receiving container receives a cartridge to be output, and provides said cartridge to be output through said opening.

13. A device as claimed in claim 12, wherein said received cartridge and said cartridge to be output are rotated an equal amount in opposite directions.

14. A device as claimed in claim 13, wherein said equal amount is 180°.

15. A device as claimed in claim 1, further comprising:
   means for determining whether said received cartridge has been input in a predetermined orientation; and
   means for outputting said received cartridge through said opening if said cartridge has not been input in said predetermined orientation.

16. A disk file device comprising:
   a stocker for accommodating a plurality of cartridges each holding a disk;
   a disk recording and reproducing device for writing data on said disk and reading data therefrom;
   a carrier for selectively supplying said cartridges from said stocker to said disk recording and reproducing device and for selectively supplying said cartridges from said disk recording and reproducing device to said stocker;
   a casing containing said stocker, said disk recording and reproducing device and said carrier, with said carrier being located between said stocker and a first portion of said casing, said carrier having a cartridge supplying and receiving opening which is formed in a portion of said casing other than said first portion;
   a cartridge displacing mechanism having means for receiving said cartridge through said opening, and means for rotating said receiving and supplying means so as to supply said received cartridge to said carrier, and a surface identifying limit switch; and
   a controller including a microcomputer for identifying, in response to a detection signal output by said limit switch, the surfaces of said cartridge inserted into said cartridge displacing mechanism.

17. A device as claimed in claim 16, in which said surface identifying limit switch is a switch whose electrodes are a pair of metal leaf springs.

* * * * *